United States Patent
Yaqub et al.

(10) Patent No.: US 8,060,139 B2
(45) Date of Patent: Nov. 15, 2011

(54) AUTHENTICATING MULTIPLE DEVICES SIMULTANEOUSLY OVER A WIRELESS LINK USING A SINGLE SUBSCRIBER IDENTITY MODULE

(75) Inventors: Raziq Yaqub, Stewartsville, NJ (US); Anthony McAuley, Glen Ridge, NJ (US)

(73) Assignees: Toshiba American Research Inc. (TARI), Morristown, NJ (US); Telcordia Technologies, Inc., Morristown, NJ (US)

(*) Notice: Subject to any disclaimer, the term of this patent is extended or adjusted under 35 U.S.C. 154(b) by 403 days.

(21) Appl. No.: 10/177,765

(22) Filed: Jun. 24, 2002

(65) Prior Publication Data

US 2004/0180657 A1    Sep. 16, 2004

(51) Int. Cl.
*H04B 1/38* (2006.01)

(52) U.S. Cl. .................. 455/558; 455/411; 455/557

(58) Field of Classification Search ............... 455/435.1, 455/411, 556, 502, 557, 558, 552.1–553.1, 455/410, 556.1, 556.2, 550.1, 41.2, 127.4, 455/418–420

See application file for complete search history.

(56) References Cited

U.S. PATENT DOCUMENTS

| | | | | |
|---|---|---|---|---|
| 6,141,564 A * | 10/2000 | Bruner et al. | ............. | 455/558 |
| 6,466,804 B1 * | 10/2002 | Pecen et al. | ............. | 455/558 |
| 6,591,084 B1 * | 7/2003 | Chuprun et al. | ............. | 455/3.05 |
| 6,591,116 B1 * | 7/2003 | Laurila et al. | ............. | 455/552.1 |
| 6,606,491 B1 * | 8/2003 | Peck | ............. | 455/411 |
| 6,615,057 B1 * | 9/2003 | Pettersson | ............. | 455/558 |
| 6,728,553 B1 * | 4/2004 | Lehmus et al. | ............. | 455/558 |
| 6,763,249 B2 * | 7/2004 | Shirai | ............. | 455/558 |
| 6,868,282 B2 * | 3/2005 | Carlsson | ............. | 455/558 |
| 6,880,761 B1 * | 4/2005 | Ritter et al. | ............. | 235/492 |
| 6,925,568 B1 * | 8/2005 | Heinonen | ............. | 713/193 |
| 6,928,299 B1 * | 8/2005 | Rinne et al. | ............. | 455/557 |
| 6,985,756 B2 * | 1/2006 | Castrogiovanni et al. | ..... | 455/558 |
| 7,551,913 B1 * | 6/2009 | Chien | ............. | 455/411 |
| 7,603,107 B2 * | 10/2009 | Ratert et al. | ............. | 455/414.1 |
| 2002/0037744 A1 | 3/2002 | Bhatia et al. | | |
| 2002/0081179 A1 * | 6/2002 | Vallstrom | ............. | 414/333 |
| 2002/0147926 A1 * | 10/2002 | Pecen et al. | ............. | 713/201 |

(Continued)

FOREIGN PATENT DOCUMENTS

CN    1300509 A    6/2001

(Continued)

OTHER PUBLICATIONS

Chinese Office Action dated Apr. 7, 2006 of corresponding CN application.

(Continued)

*Primary Examiner* — Anthony Addy
(74) *Attorney, Agent, or Firm* — Banner & Witcoff, Ltd.

(57) ABSTRACT

A system and method for allowing mobile devices to simultaneously access a Subscriber Identity Module (SIM) are disclosed. The SIM contains a wireless transceiver, and the SIM may be located within a mobile phone, or it may be a stand-alone device. The mobile devices use a wireless protocol, such as Bluetooth, to retrieve identification information from the SIM. The devices then use this identification information to connect to a wireless communications network, such as a wireless local area network. Through this network the devices will be able to access the Internet. The SIM will never need to be removed and inserted from one device to another, and multiple devices can use the SIM simultaneously. Thus, the mobile phone will work regardless of whether other devices are also using the SIM.

16 Claims, 12 Drawing Sheets

U.S. PATENT DOCUMENTS

2003/0119482 A1* 6/2003 Girard .......................... 455/411
2004/0042442 A1* 3/2004 Pecen et al. .................. 370/352
2004/0043791 A1* 3/2004 Reddy .......................... 455/558

FOREIGN PATENT DOCUMENTS

| GB | 2363218 A * | 12/2001 |
|---|---|---|
| WO | 98/33343 | 7/1998 |
| WO | WO 98/33343 | 7/1998 |
| WO | WO 99/59360 | 11/1999 |
| WO | 01/95605 | 12/2001 |
| WO | WO 01/95605 A1 | 12/2001 |
| WO | 02/05583 | 1/2002 |
| WO | WO 02/05583 A1 | 1/2002 |

OTHER PUBLICATIONS

Notice of Reasons for Rejection in the Japanese Application No. 2004-515702 dated Feb. 17, 2009.
Rejection Decision in Chinese Application No. 03814881.1 dated Jun. 5, 2009 and English translation thereof.
Notice of Preliminary Rejection dated Jun. 23, 2010 in Korean Application No. 10-2004-7021000 and English translation thereof.
Search Report.

* cited by examiner

AUTHENTICATING MULTIPLE DEVICES SIMULTANEOUSLY OVER A WIRELESS LINK USING A SINGLE SUBSCRIBER IDENTITY MODULE

FIELD OF THE INVENTION

The invention relates generally to Subscriber Identity Modules (SIMs). More specifically, the invention relates to the simultaneous use of a SIM by multiple devices to gain access to a wireless communications network.

BACKGROUND

Subscriber Identity Modules (SIMs) are devices within mobile phones that are used to identify and authenticate a user to a mobile phone network so that the network can authorize the user to place and receive calls. In addition, SIMs encrypt conversations through the use of algorithms as are known in the art. SIMs are presently found in most mobile phones. A SIM includes a processor and memory, and some types of SIMs can be removed from the mobile phone. A Universal Subscriber Identity Module (USIM) is a next-generation SIM. Hereinafter, both SIMs and USIMs will be collectively referred to as SIMs.

Mobile phone service operators now commonly provide users Internet access through their mobile phones. As with a mobile phone conversation, the SIM functions to identify and authenticate the user who seeks to be connected to the Internet and to encrypt data being transmitted.

A wireless communications network is a network that allows devices to connect without the use of cables or wires. It has become increasingly popular to connect to a wireless communications network in order to access the Internet from a mobile computing device (e.g., a laptop computer or a handheld device). Many operators of mobile phone networks have or likely will enter into the business of providing wireless communications networks in parallel to their mobile phone service. A common example of a wireless communications network is a wireless local area network, which provides higher access speeds than a conventional wireless phone network.

Several users of mobile computing devices also own mobile phones that have Internet access. If the users have access to a wireless communications network, they can access the Internet either from their phone or their mobile computing device. However, in order to access a wireless communications network, the laptop or handheld device must be connected to a SIM. Thus, either the user must have one SIM for each device with which the user would like to connect to the wireless network, or the user must remove the SIM from one device and insert it into another device each time the user wants to connect to the wireless network. The first solution is problematic because either the user is forced to subscribe to two different services (a mobile phone service and a WLAN service) or, if the same operator operates both networks, the user must have an account for each device with which he accesses the Internet. In addition, family members that would like to connect to the Internet using different devices must each have their own SIM, which can complicate billing issues. The user must also synchronize data held on multiple devices. The second solution is problematic not only because the user must physically remove the SIM and insert it into another device, but also because only one device can be used to access the Internet at one time. Thus, no simultaneous access can occur with only one SIM. Also, if the SIM is taken out of a mobile phone, the phone cannot be used to place or receive phone calls. Thus, there is a need for a simpler way of allowing a user who owns multiple devices to connect to the Internet on each device.

SUMMARY

Aspects of the present invention solve at least some of the shortcomings of the prior art by providing a SIM that can communicate wirelessly with mobile devices so that at least one device can remotely use one SIM to connect to wireless networks. The SIM may be present within a mobile phone, or it may be a stand-alone device. Because the SIM does not need to be physically relocated among devices, the mobile phone may still be used while a laptop or handheld device accesses the SIM.

DETAILED DESCRIPTION

Aspects of the invention provide functionality that allows a laptop or handheld device user to wirelessly use a Subscriber Identity Module (SIM) that is not attached to the user's device to access a wireless communications network. The SIM may exist either within a mobile phone or as a stand-alone device. The user subscribes to the service through a wireless service operator, who likely controls both the wireless communications network and a mobile phone network. When the user desires to connect to the Internet with the user's mobile computing device (e.g., a laptop computer or a handheld device), the user's mobile computing device communicates with the SIM wirelessly to obtain the identification information. Once the information is obtained, the user can access the wireless communications network through the mobile computing device as if the SIM was attached to the device.

Figure 1:
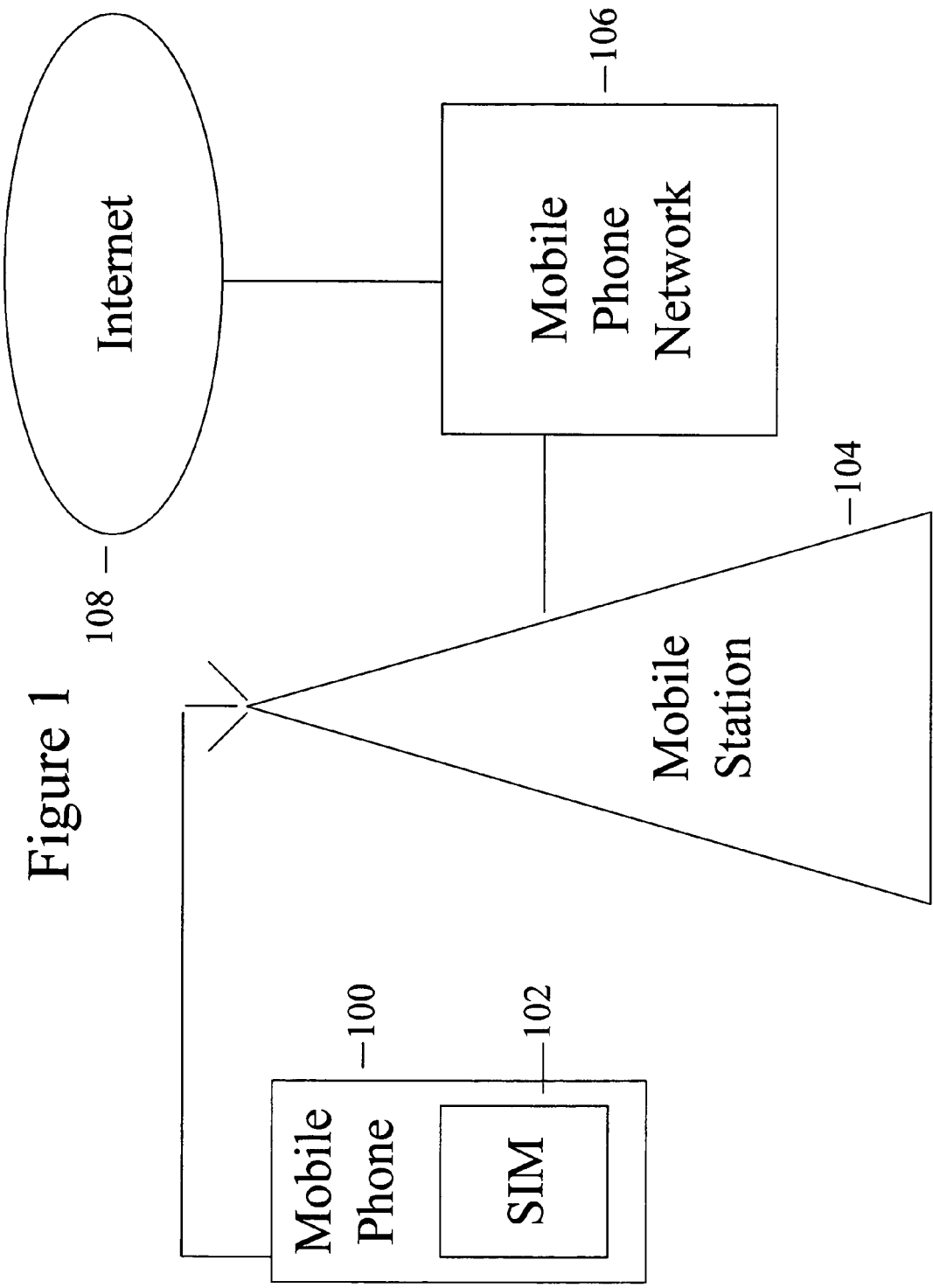
FIG. 1 illustrates a conventional mobile phone with a conventional SIM within a mobile phone network.

FIG. 1 illustrates how a mobile phone that is enabled to access the Internet generally functions in a conventional system. A mobile phone 100 contains a SIM 102 that may or may not be removable. The mobile phone communicates with a mobile station 104, which is connected to the mobile phone network 106. A mobile phone service operator operates the network 106. If the mobile phone user desires to use the Internet, then the user can access the Internet through the mobile phone network 106, which is connected to the Internet 108.

The SIM 102 is used to identify the mobile phone user to the mobile phone network 106, which authenticates and authorizes the user, whose information is contained in a database, such as a Home Location Register (HLR). The SIM 102 also encrypts voice and data transmissions through algorithms so that others cannot listen in on conversations. If the SIM 102 is removed from the mobile phone 100, the user will not be able to place or receive calls, or access the Internet. A SIM 102 stores several types of data. Administrative data relates to manufacturer, service provider, identity, and security information. Temporary network data is information on the location of the phone and temporary security and identity values. Service data pertains to information on whether the user may access different services. A SIM 102 also stores applications that run services or provide features. Finally, a SIM 102 contains personal data entered by the user. A Universal Subscriber Identity Module (USIM) is a SIM that is compatible with the Universal Mobile Telecommunications System (UMTS).

Figure 2:
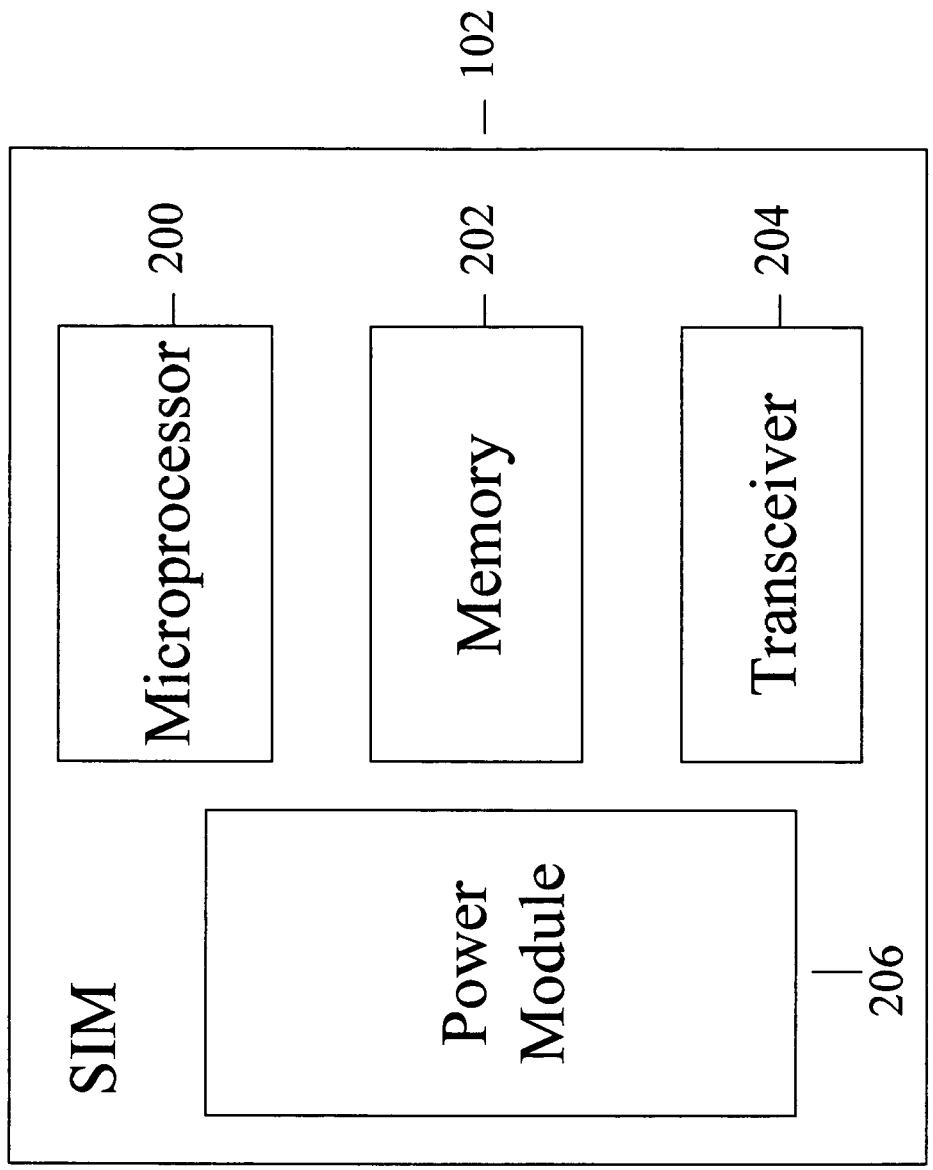
FIG. 2 illustrates a SIM in accordance with embodiments of the present invention.

FIG. 2 describes the SIM 102 in detail as is disclosed in aspects of the present invention. The SIM includes a microprocessor 200 and memory 202, which is standard in the field. The SIM may also include a wireless transceiver 204. In different embodiments of the invention, the wireless transceiver may use, but is not limited to, Bluetooth, 802.11a, 802.11b, infrared, GSM, small range WLAN, and other communication protocols. In some embodiments of the invention, the SIM may contain a power module 206, such as a battery, although this will not be the case in every embodiment. The power module 206 may be included if the SIM is a stand-alone device as described below.

The SIM may be a part of a mobile phone, and/or it may be a stand-alone device. If it functions as a stand-alone device, subscribers can carry it in a wallet, which could possibly allow the user to easily access public communications terminals or pay tolls on highways. In addition, having a stand-alone SIM, such as in a wallet offers certain security advantages.

Figure 3:
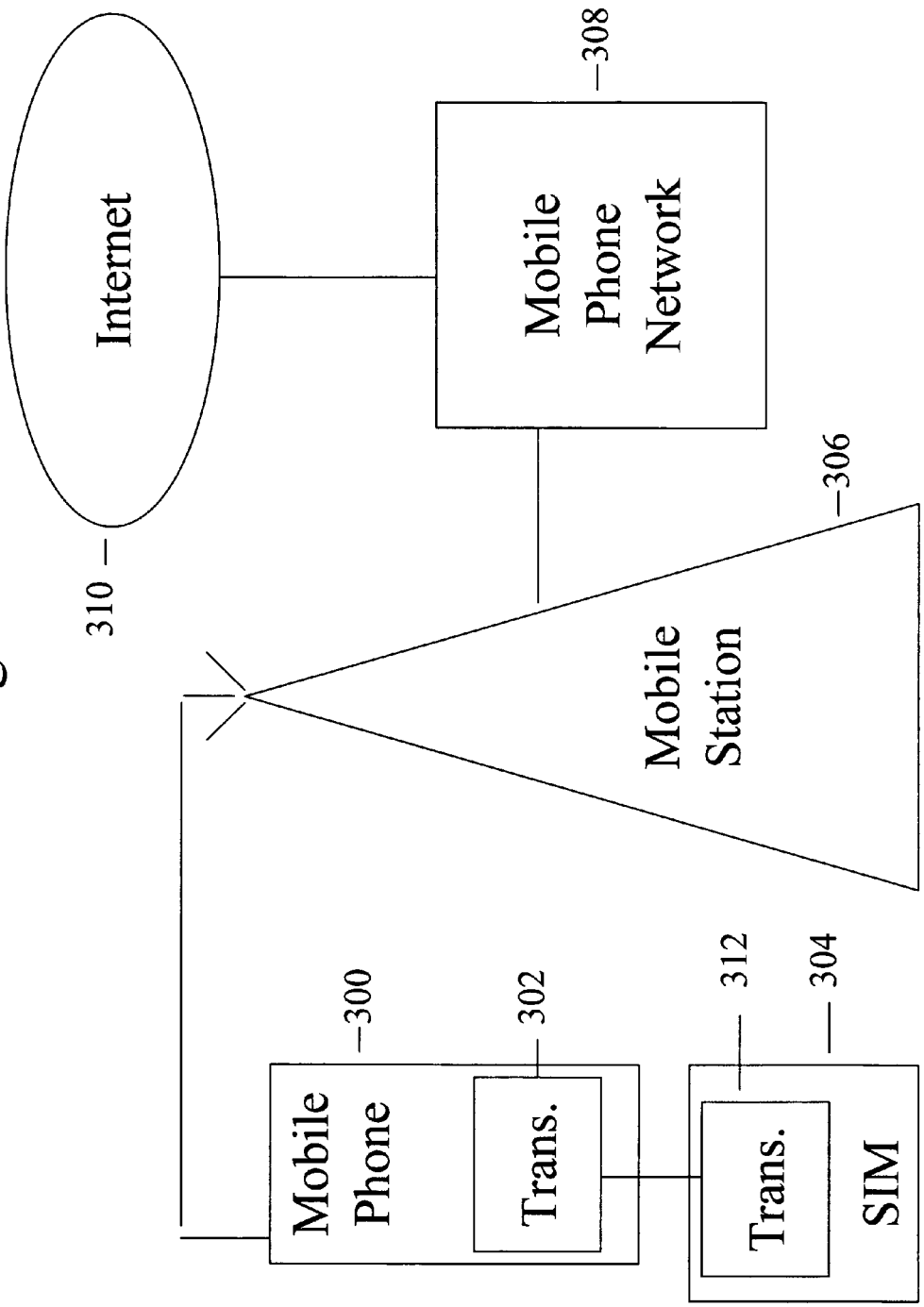
FIG. 3 illustrates a mobile phone that uses a stand-alone SIM to connect to a mobile phone network in accordance with embodiments of the present invention.

FIG. 3 shows how a mobile phone works if the SIM is a stand-alone device. The mobile phone 300 communicates with the SIM 304 through the wireless transceiver 302 in the phone and the wireless transceiver 312 in the SIM when the user desires to place or receive a call, or access the Internet 310. The mobile phone 300 requests identification information from the SIM 304, which transmits the identification information to the phone 300. The phone then uses the identification information to send to the mobile station 306, which in turn transmits it to the mobile phone network 308. The network 308 then authenticates and authorizes the user and handles account information, such as billing. If the user desires to access the Internet 310, the network 308 may provide that functionality. The mobile phone 300 works as if it has the SIM inside it. In different embodiments of the present invention, the mobile phone network may be, but is not limited to, GSM, WCDMA, 3GPP, TDMA, CDMA, FDMA, IP telephony, UMTS, or PCS. In addition, in different embodiments the SIM may be a USIM. Finally, mobile phone 300 is not limited to using SIM 304. It can use other SIMs to connect to the mobile phone network 308. In some embodiments, the phone 300 may be configured to automatically use the phone user's SIM, but it may still be reconfigured to use another SIM.

If the SIM is contained within the mobile phone, as it is in some embodiments, the system functions similarly to the system in FIG. 1. The SIM 102 may contain a wireless transceiver 204, as shown in FIG. 2, and it may contain a power module 206, as shown in FIG. 2. As above, in different embodiments of the present invention, the mobile phone network may be, but is not limited to, GSM, WCDMA, 3GPP, TDMA, CDMA, FDMA, IP telephony, UMTS, or PCS. Also, in different embodiments, the SIM may be a USIM.

Figure 4:
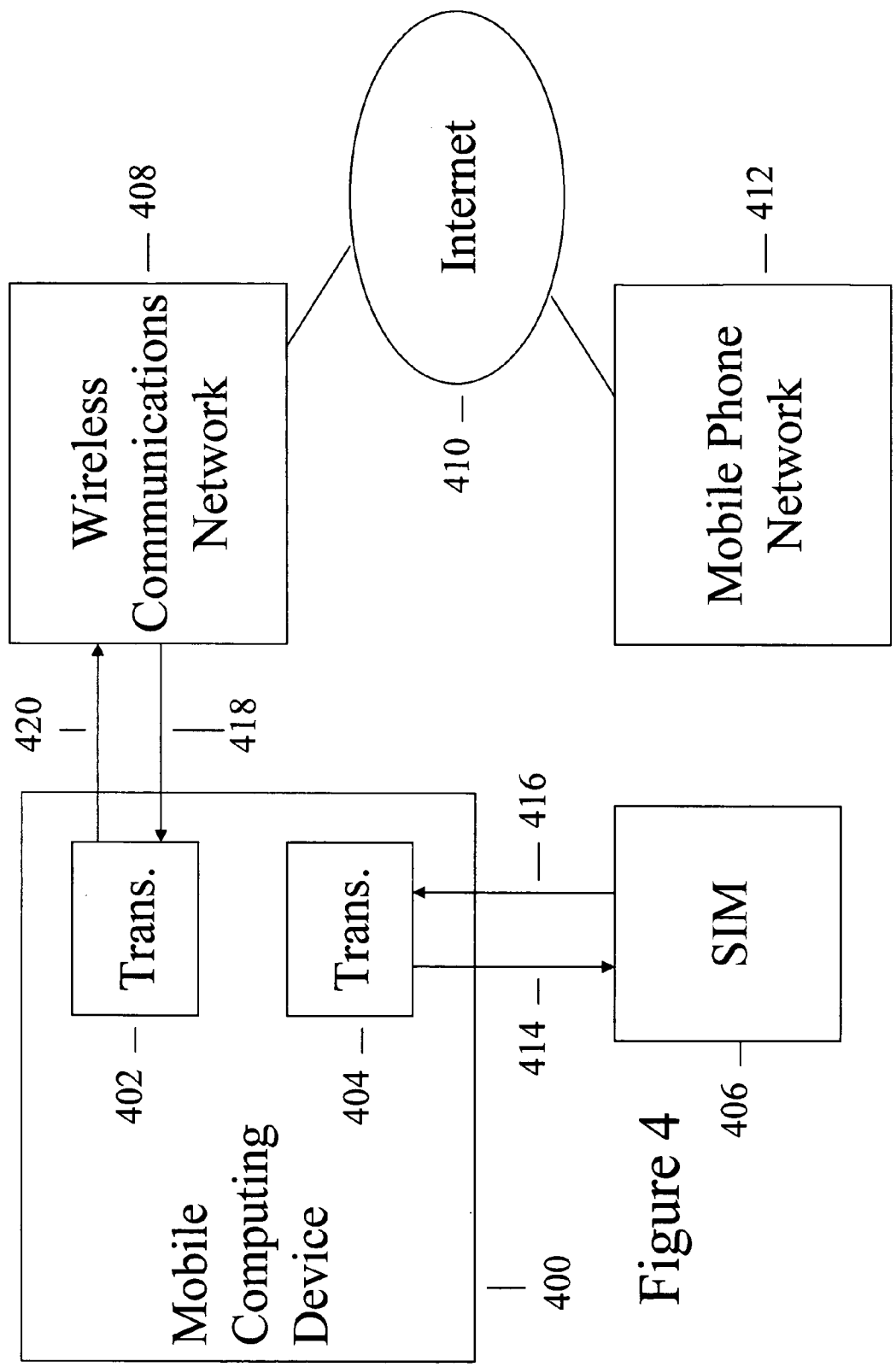
FIG. 4 illustrates a mobile computing device that uses a wireless SIM to connect to a wireless communications network in accordance with embodiments of the present invention.

FIG. 4 shows how a mobile computing device 400 connects to a wireless communication network in the present invention. The mobile computing device 400 may contain one or more wireless transceivers 402 and 404. When the user desires to access the wireless communications network 408, the mobile computing device 400 must locate a SIM 406. In some embodiments, the device 400 may be pre-configured to use SIM 406, or the user may tell the device to use SIM 406. In still further embodiments, the device may search for nearby SIMs and return a list of SIMs to the user. The user may then select which SIM to use. As explained above, SIM 406 may be integrated into a mobile phone, or SIM 406 may be a stand-alone device in different embodiments. Once SIM 406 is located, wireless transceiver 404 communicates with the SIM. In different embodiments, the wireless transceiver 404 may use, but is not limited to, Bluetooth, 802.11a, 802.11b, infrared, GSM, or small range WLAN. SIM 406 provides the identification information to the mobile computing device 400, which can then use the identification information to connect to the wireless communications network 408. The mobile computing device 400 can use either the same wireless transceiver 404 or a different wireless transceiver 402 to communicate with the wireless communications network 408. The transceiver that communicates with the wireless communications network may use, but is not limited to, 802.11a, 802.11b, GSM, or WLAN. The protocol used for communication paths 414 and 416 does not need to be used for communications paths 418 and 420. Furthermore, for security purposes the protocol used for communications path 414 may differ from path 416, and the protocol used for path 418 may differ from path 420. For example, transceiver 404 may transmit with Bluetooth, and SIM 406 may return with infrared. Also, in different embodiments, the SIM 406 may be a USIM. Communication between mobile computing device 400 and SIM 406 does not include the transmission of security data, such as encryption algorithms or long-term keys. Rather, when device 400 requires access to security data, it will send a challenge to SIM 406, which will in return send a response to device 400. For example, device 400 may need some data decrypted, so it will send a challenge to SIM 406 asking for decryption. SIM 406 will decrypt the data using stored algorithms, and SIM 406 will send the data back to device 400. Thus, security data is not compromised.

The wireless communications network 408 performs its own authentication and authorization, but it can communicate with the mobile phone network 412. Once authentication and authorization occurs, the user can access both the wireless communications network 408 and the Internet 410, which is connected to the wireless communications network 408.

Figure 5:
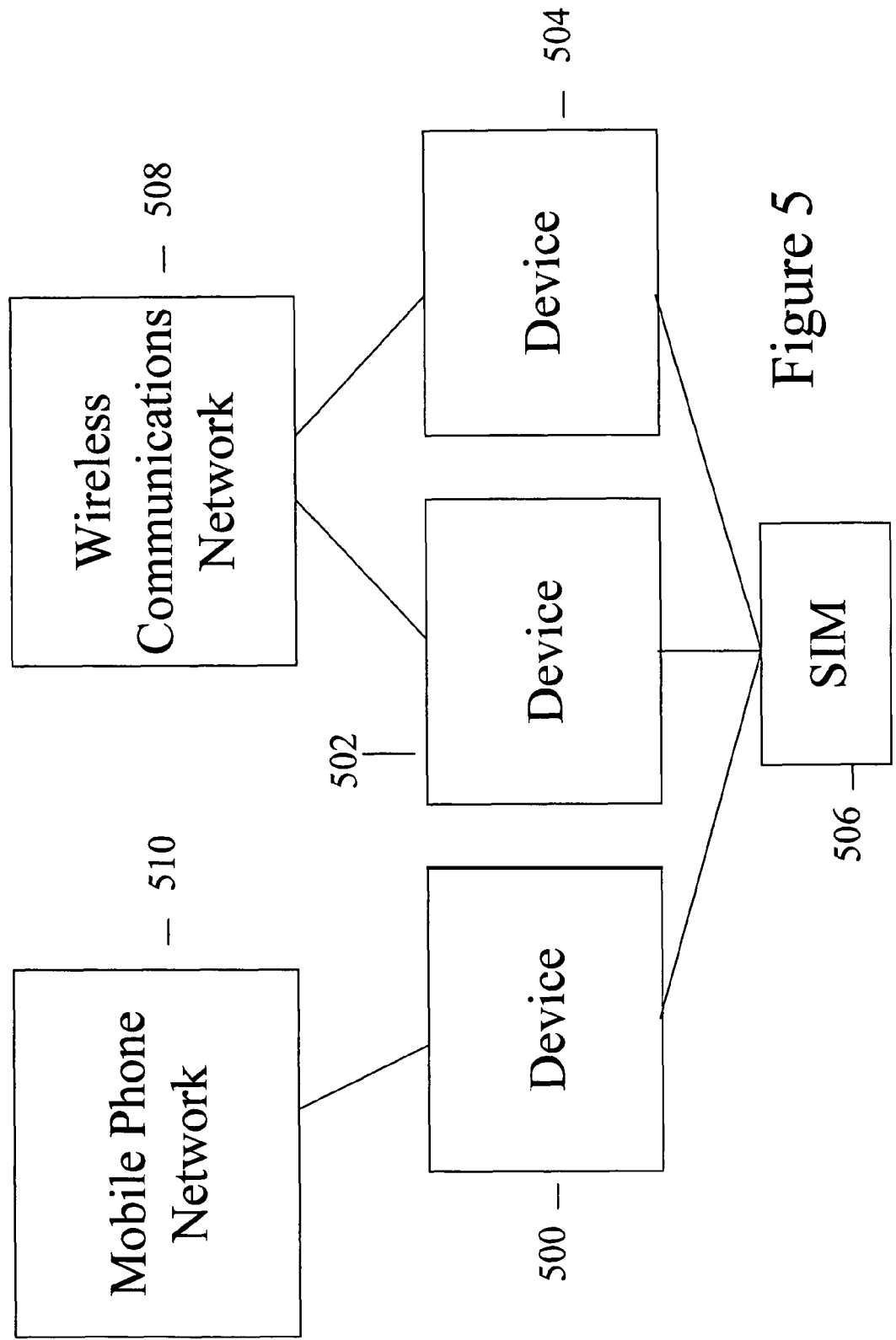
FIG. 5 illustrates multiple mobile devices that use a single SIM in accordance with embodiments of the present invention.

At this point, the mobile computing device 400 behaves as if the SIM 406 was inserted into the device 400. However, because the SIM 406 is not inserted into the device 400, and because the SIM 406 is wireless, other devices can simultaneously use the SIM to authenticate with the network. FIG. 5 illustrates the system of simultaneous access to networks by multiple devices. Devices 500, 502, and 504 can all request identification information from the SIM 506. The SIM 506 may be part of a mobile phone, or SIM 506 may be a standalone device. In some embodiments, device 500 may be a mobile phone that uses the identification information to communicate with a mobile phone network 510. In some embodiments, device 502 may be a handheld device, such as a personal digital assistant (PDA), and device 504 may be a laptop computer, both of which may use the identification information to communicate with a wireless communications network 508. Thus, the system allows multiple devices to simultaneously access different networks, operated by a common operator, using the same identification information from the same SIM. Through this system, a user can have access to a wireless communications network 508 from the user's laptop without losing the ability to place and receive phone calls from the user's mobile phone. Also, in different embodiments, the SIM 506 may be a USIM.

Figure 6:
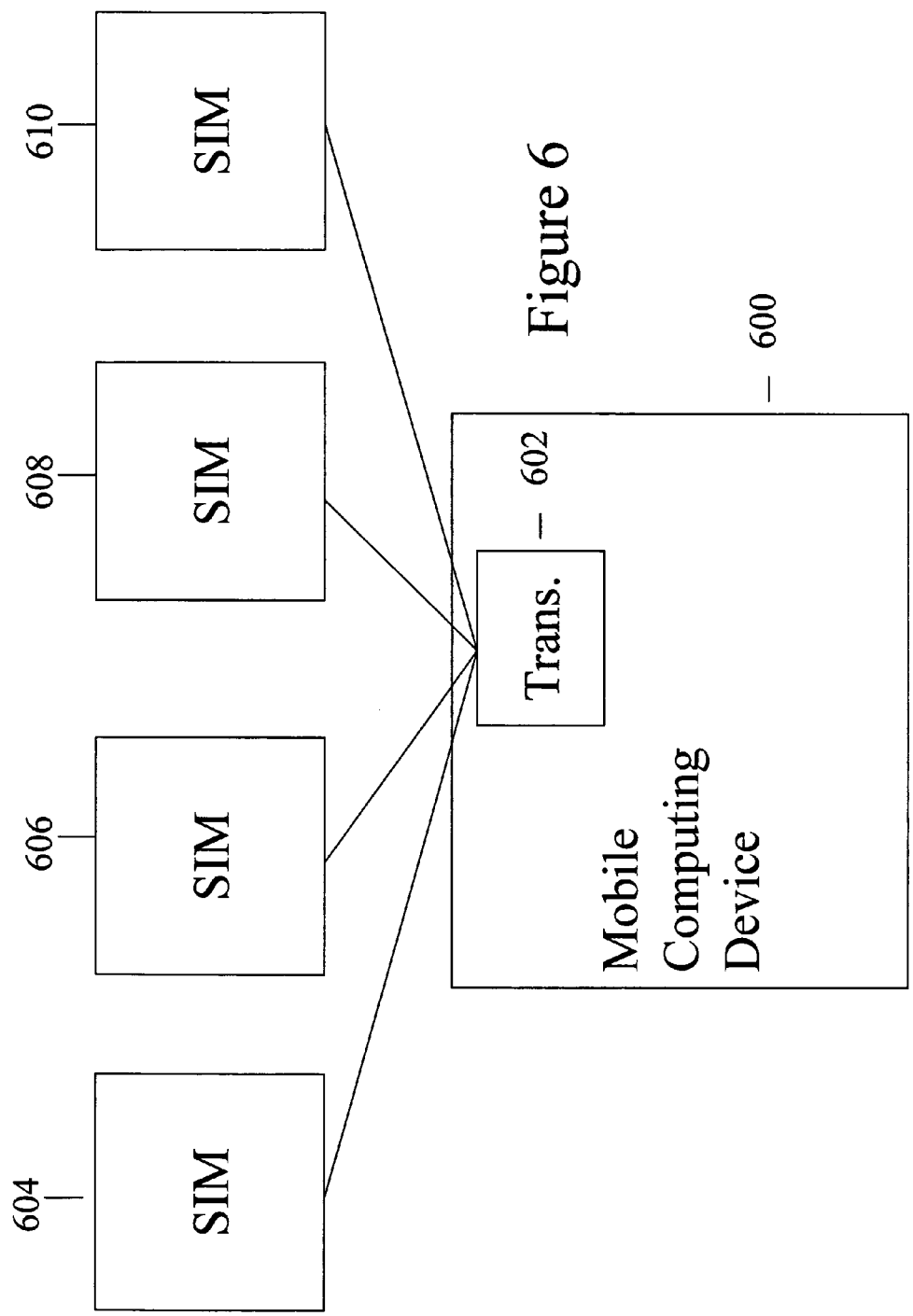
FIG. 6 illustrates a communication between a mobile computing device with multiple SIMs in its area in accordance with embodiments of the present invention.

FIG. 6 illustrates the scenario of when a single mobile computing device 600 is within the range of multiple SIMs 604, 606, 608, and 610. In some embodiments, the user of the device will have pre-configured the device 600 so that the wireless transceiver 602 knows to always use, for example, SIM 604. In other embodiments, at the time the user wants to connect to the wireless communications network, the user of the device will inform the device to use, for example, SIM 604. In still other embodiments, the device will search for SIMs in the area. The device will display to the user a menu showing a list of SIMs 604, 606, 608, and 610 that are within range. The user may then select from the menu which SIM to use. Also, in different embodiments, any of the SIMs may be a USIM.

Figure 7:
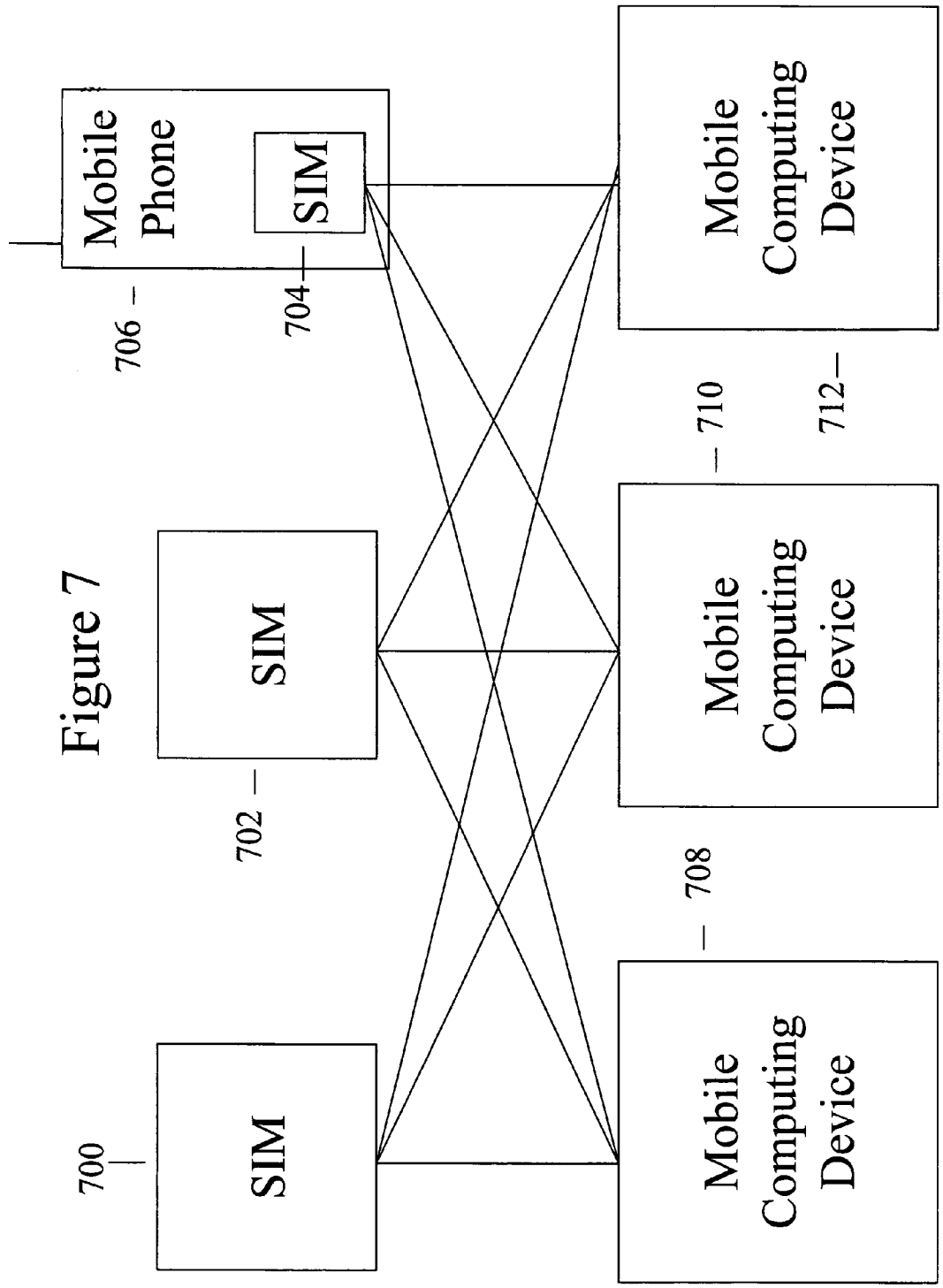
FIG. 7 illustrates the communication between multiple SIMs and multiple devices within the same area in accordance with embodiments of the present invention.

FIG. 7 illustrates the scenario of when multiple mobile computing devices 708, 710, and 712 exist in the same area as multiple SIMs 700, 702, and 704. SIM 704 is contained within a mobile phone 706. However, it operates in the same way as SIM 700 and 702. If authenticated and authorized, any mobile computing device may use any SIM. Furthermore, if authenticated and authorized, all three devices 708, 710, and 712 may use the same SIM simultaneously to obtain identification information. As discussed above, mobile phone 706 can be used even if mobile computing devices 708, 710, and 712 are using SIM 704. Also, in different embodiments, any of the SIMs may be a USIM.

Figure 8:
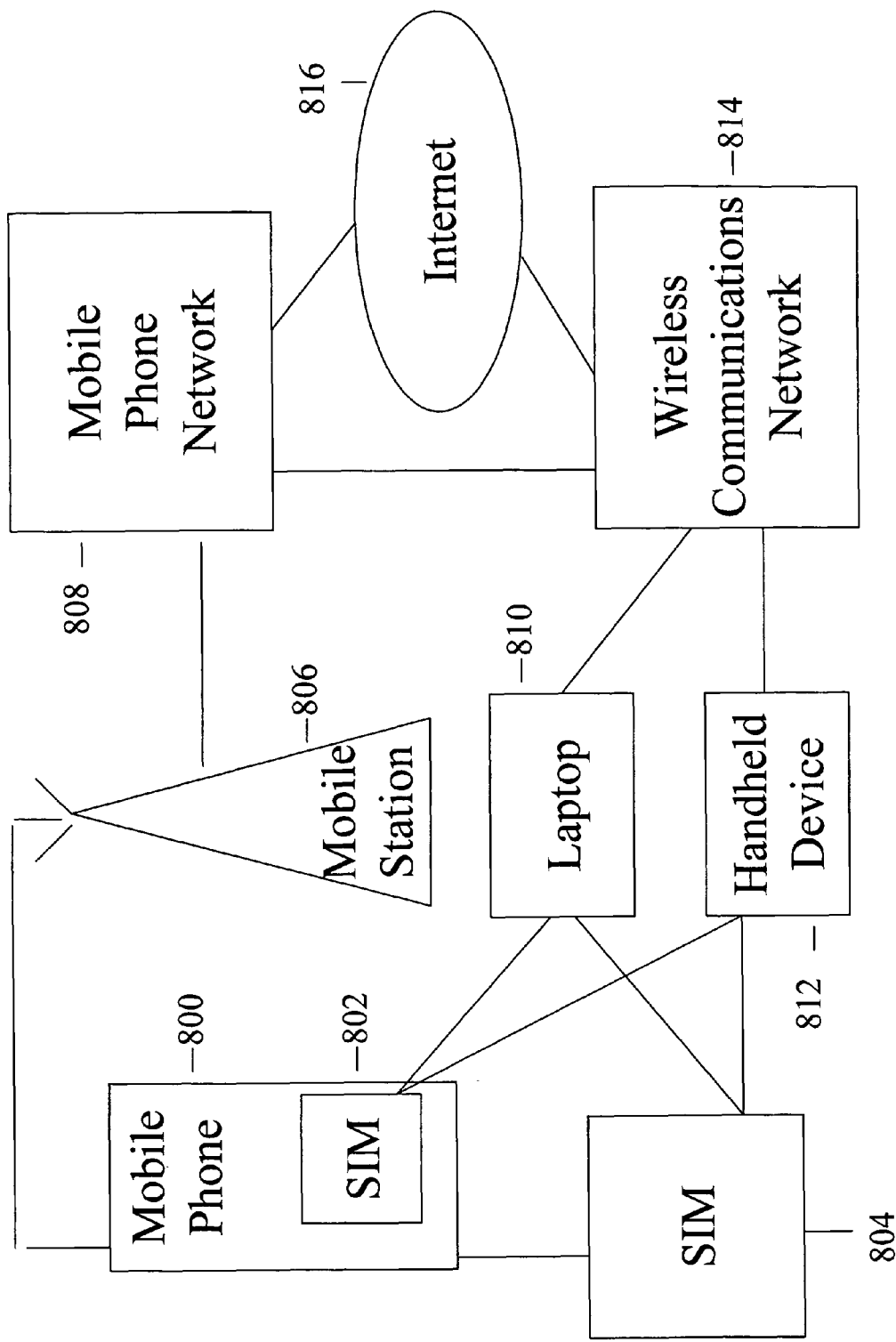
FIG. 8 illustrates mobile computing devices and mobile phones using SIMs to access networks in accordance with embodiments of the present invention.

FIG. 8 describes an embodiment of the invention. Mobile phone 800 may use embedded SIM 802 to connect to the mobile phone network 808 through the mobile station 806. Or, if the mobile phone user owns a stand-alone SIM 804, the mobile phone 800 may use that SIM to connect to the mobile phone network 808. In that case, the mobile phone 800 communicates with the SIM 804 through a wireless protocol, such as Bluetooth. The mobile phone 800 can both place and receive calls using the mobile phone network and access the Internet 816. A user who also owns a mobile computing device, such as a laptop 810 or a handheld device 812, may want to connect to a wireless communications network 814, such as a WLAN. The user can either access a SIM 802 in the user's mobile phone 800 or a stand-alone SIM 804. Either way, the laptop 810 and handheld device 812 will communicate with either SIM 802 or SIM 804 using a wireless protocol, such as Bluetooth. Using identification information retrieved from SIM 802 or SIM 804, the wireless communications network 814 can authenticate and authorize the user. Then, the user can access the wireless communications network 814 and the Internet 816.

Several features of the embodiment make it useful. The laptop 810 and the handheld device 812 can simultaneously use either SIM 802 or SIM 804. SIM 802 does not have to be removed from mobile phone 800 in order to be used by laptop 810 or handheld device 812. While the laptop 810 or handheld device 812 is using the SIM 802, the mobile phone 800 can place or receive calls through the mobile phone network 808 and can access the Internet 816. The same operator likely operates both the wireless communications network 814 and the mobile phone network 808. Thus, the user only subscribes to one network operator, yet has the same security level and access to both networks. This also simplifies account billing, since the user can receive all his Internet and mobile phone access through a single operator and a single account. Also, the mobile phone network 808 and the wireless communications network 814 may support mutual authentication, meaning the same identification information authenticates the user on both networks.

In some embodiments, network service operators may want to implement additional features. First, the operators may minimize any changes in their subscriber databases (e.g., HLRs and HSSLRs). Also, the mobile phone networks and wireless communications networks may support conventional SIMs and USIMs. Operators may minimize the change in software for mobile devices and the need for administering this software. Finally, the system may support existing hardware in the wireless networks.

Figure 9:
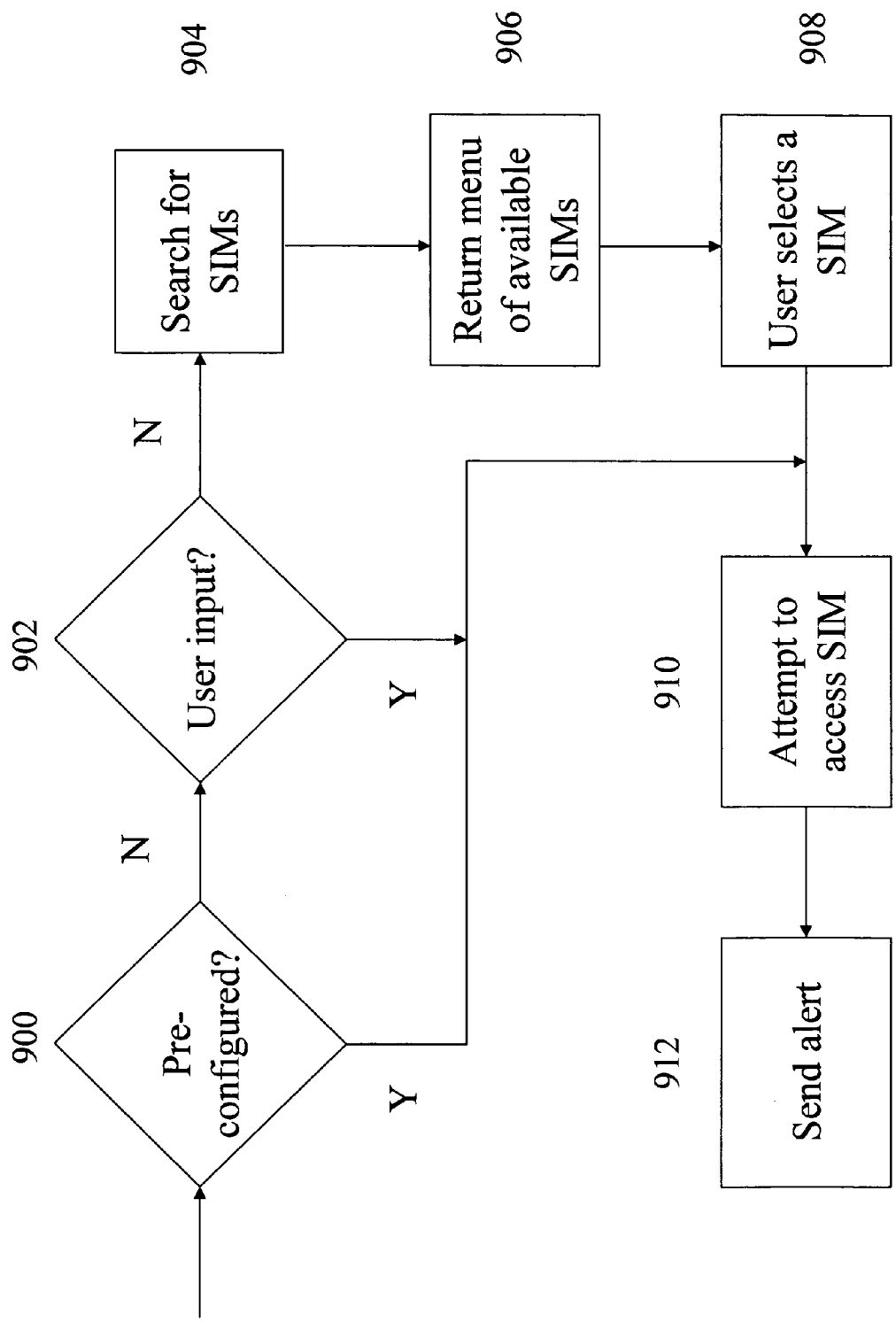
FIG. 9 shows a method of finding a SIM to use for a device in accordance with embodiments of the present invention.

The flowchart of FIG. 9 describes the steps of searching for a SIM in more detail. In decision step 900, the device will determine whether it is pre-configured to use a certain SIM. If so, it will proceed to step 910 to attempt to access the SIM. If not, the device will ask for a user to input the SIM in step 902. If the user does, the device will attempt to access the SIM in step 910. If not, the device will search for SIMs in the area in step 904 and will return a menu with a list of available SIMs in step 906. The user may select a SIM in step 908, and the device will attempt to access it in step 910. Step 910 is the same as step 1000 in FIG. 10. Thus, as described below, the owner of the SIM (who may be the same person as the user) will be alerted in step 912 when the user attempts to access the SIM, as in step 1002.

The system provides for security to prevent unauthorized users from using a SIM. First, any user must input credentials, such as a password, to verify that he is authorized to use the SIM. In addition, the SIM may be programmed to function only for certain devices. However, that method may limit the functionality and compatibility of the SIM. The relatively low range of the SIM provides an additional level of security against unauthorized users, although this is partially dependent upon the type of protocol used to communicate between the SIM and the device. Regardless, an owner knows that a potential unauthorized user must be within a certain range specified by the wireless protocol used. Another security measure is that the SIM can be powered off to prevent others from accessing it. A further step to prevent unauthorized use is that whenever someone tries to access a SIM, the SIM can be alerted, or an alert can be sent to a specified device. If the alert goes directly to the SIM, it may beep or otherwise give some sort of signal. If the alert goes to a specified device, a message will be displayed informing the user of the access. The user can then decide whether the access is authorized and can allow or disallow it.

Figure 10:
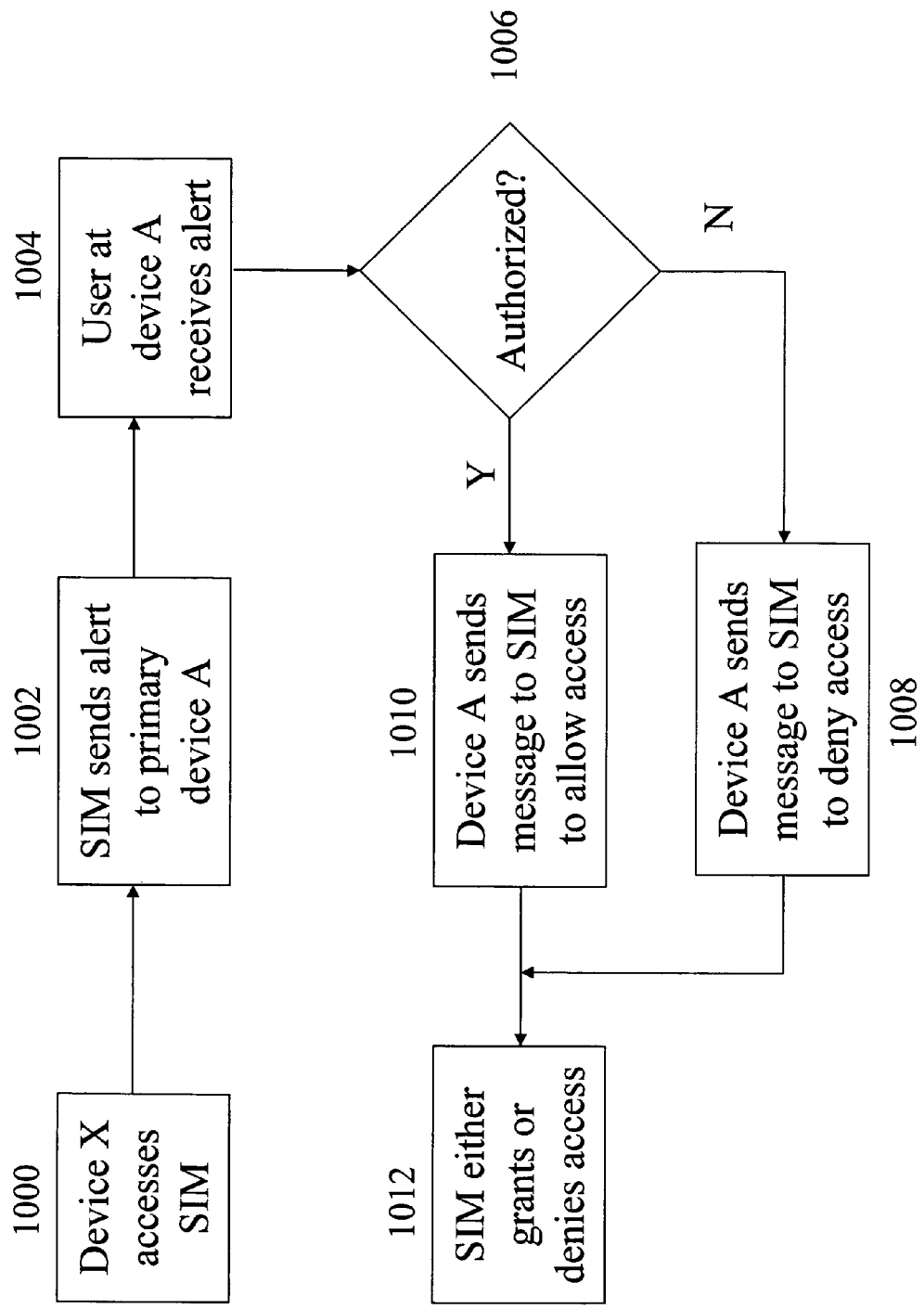
FIG. 10 shows a method of sending an alert when a device accesses a SIM in accordance with embodiments of the present invention.

The steps of this process are further detailed in the flowchart of FIG. 10. In step 1000, device X (e.g., a mobile phone or a mobile computing device) accesses a SIM (whether embedded in a mobile phone or stand-alone). The SIM wirelessly sends an alert in step 1002 to primary device A, which was predetermined. The primary device would most likely be whatever device is most frequently used or left on by the user. In step 1004, the user at device A receives an alert in the form of a message that pops up at the device. The message informs the user that another device has requested identification information from the SIM, and the message presents a user with a choice of whether to allow the access or not in decision step 1006. If the user chooses not to allow the access, a message will be sent to the SIM in step 1008 to deny access to the requesting device, and the SIM will not send the identification information to the requesting device in step 1012. If the user chooses to allow the access, on the other hand, the device will send a message to the SIM to allow the requesting device access in step 1010. In that case, the SIM in step 1012 will grant access to the requesting device.

Figure 11:
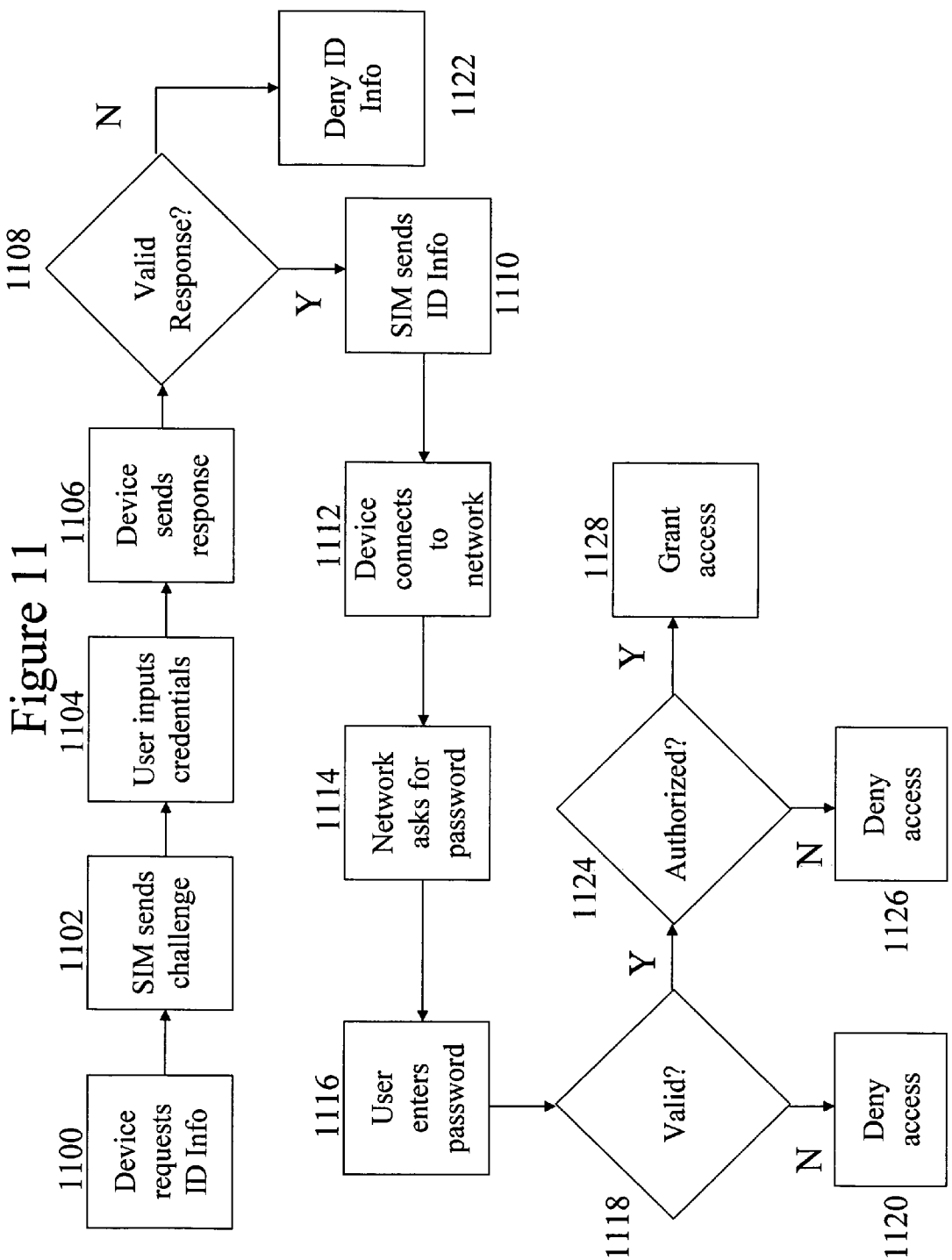
FIG. 11 shows a method of a mobile device using a SIM to connect to a wireless communications network in accordance with embodiments of the present invention.

FIG. 11 illustrates in more detail the process of retrieving identification information from a SIM when a mobile device user wants to connect to a wireless communications network. The device in step 1100 makes a request to a SIM for the identification information. In step 1102, the SIM sends a challenge to the device, which is the first layer of security. The user then will be prompted to enter in the user's credentials in step 1104, and the device will send a response with the credentials in step 1106 back to the SIM. The SIM will then attempt to authenticate the user in step 1108. If the response is invalid, the user will deny access to the identification information in step 1122. If the response is valid, the SIM will send the identification information to the device in step 1110, and the device connects to the wireless communications network in step 1112. In step 1114, the network will ask the user to enter in a password, which is the second layer of security. The user will input the password in step 1116, and the network will attempt to authenticate the user in decision step 1118. If the user cannot be authenticated, the network will deny access in step 1120. If the network can authenticate the user, the network will then attempt to authorize the user in step 1124. If the user cannot be authorized, the network will deny access in step 1126. If the network can authorize the user, it will grant access in step 1128.

Figure 12:
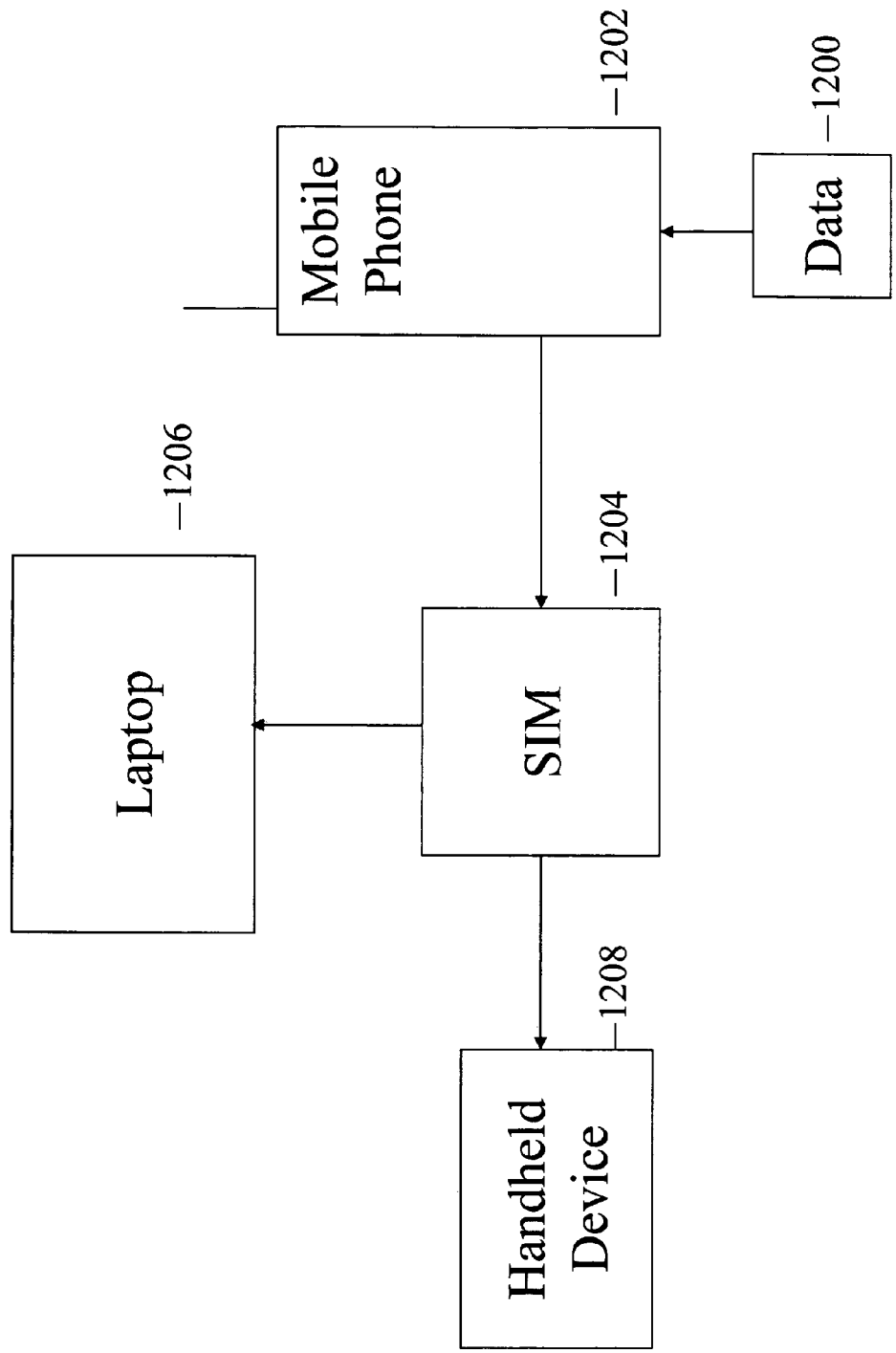

FIG. 12 shows another aspect of the invention, the automatic synchronization of information among devices. This aspect of the invention eliminates the need to manually reenter data and the need to manually synchronize data through software. The synchronization in FIG. 12 takes place automatically and is transparent to the user. A user may enter data 1200, such as entries in a phonebook, on a mobile phone 1202, which is in communication with a SIM 1204. When a laptop 1206 and a handheld device 1208 begin communicating with SIM 1204, the SIM automatically synchronizes the laptop 1206 and handheld 1208, updating their phonebooks. In some embodiments, the data 1200 may be stored on the phone 1202, and the SIM 1204 may provide the synchronization by taking the data 1200 from the phone 1202 and sending it to the laptop 1206 and handheld 1208. In other embodiments, the data 1200 may be stored on the SIM 1204 itself. Thus, when the data is entered into the phone 1202, it is immediately transferred to the SIM 1204. In some embodiments, the SIM 1204 may be contained within the phone 1202. Also, in some embodiments, the SIM 1204 may be a USIM.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   establishing a first communication path from a Subscriber Identity Module (SIM) to a first device, the SIM including a wireless transceiver;
   transmitting information from the SIM to the first device via the first communication path to permit the first device to connect to a first network;
   establishing a second communication path from the SIM to a second device;
   transmitting information from the SIM to the second device via the second communication path to permit the second device to connect to a second network;
   connecting the second device to the second network; wherein
   the first network is a cellular radio-based network,
   the second network is an IEEE-based network,
   the second device can access the second network while the first device accesses the first network,
   at least one of the first device and the second device includes a wireless transceiver,
   at least one of the first communication path and the second communication path is a wireless communication path that directly connects the wireless transceiver of the SIM with the wireless transceiver of the first device or the second device, and
   connecting the second device to the second network includes:
   locating an IEEE-based network with which the second device can communicate;
   transmitting identification information to said IEEE-based network; and
   receiving authorization at the second device from the IEEE-based network.

2. The method of claim 1, wherein establishing the second communication path from the SIM to the second device further comprises:
   receiving device authentication information at said SIM;
   verifying said device authentication information; and
   authenticating said second user device using said device authentication information.

3. The method of claim 2, wherein the device authentication information includes information for determining an identity of a user associated with said second device, and wherein said step of verifying said device authentication information includes determining said identity of said user associated with said second device.

4. The method of claim 1, further comprising:
   connecting the first device to the first network.

5. The method of claim 4, wherein said second IEEE-based network is a wireless communications network.

6. The method of claim 5, wherein said wireless communications network is a wireless local area network.

7. The method of claim 1, wherein the wireless transceiver of the SIM and the wireless transceiver of the first device or the second device communicate over the wireless communication path using a Bluetooth protocol.

8. The method of claim 1, wherein said second device is a handheld device.

9. The method of claim 1, wherein said second device is a laptop computer.

10. The method of claim 1, wherein said SIM is located in a mobile phone and said SIM is configured to use a transceiver provided by said mobile phone to transmit said information from said SIM to said first device and to transmit said information from said SIM to said second device.

11. The method of claim 1, wherein said SIM is a stand-alone device.

12. The method of claim 1, wherein said SIM is a Universal Subscriber Identity Module (USIM).

13. The method of claim 1, wherein establishing the first communication path from the SIM to the first device occurs using a wireline protocol.

14. The method of claim 1, wherein the wireless transceiver of the SIM and the wireless transceiver of the first device or the second device communicate over the wireless communication path using an infrared protocol.

15. The method of claim 1, wherein the wireless transceiver of the SIM and the wireless transceiver of the first device or the second device communicate over the wireless communication path using a wireless local area network (WLAN) protocol.

16. The method of claim 1, further comprising:
receiving encrypted network data at the SIM via the wireless communication path;
decrypting the encrypted network data at the SIM; and
transmitting the decrypted network data from the SIM via the wireless communication path.

* * * * *